United States Patent [19]

Droescher et al.

[11] Patent Number: 4,555,550

[45] Date of Patent: Nov. 26, 1985

[54] MOLDING COMPOSITIONS BASED ON HIGH MOLECULAR WEIGHT POLYETHER ESTER AMIDES

[75] Inventors: Michael Droescher; Salih Mumcu; Klaus Burzin; Christian Gerth; Horst Heuer, all of Marl, Fed. Rep. of Germany

[73] Assignee: Chemische Werke Huels, A.G., Marl, Fed. Rep. of Germany

[21] Appl. No.: 705,168

[22] Filed: Feb. 25, 1985

[30] Foreign Application Priority Data

Feb. 25, 1984 [DE] Fed. Rep. of Germany ....... 3406951

[51] Int. Cl.⁴ ............................................. C08L 77/00
[52] U.S. Cl. .................................... 525/424; 524/101; 528/492
[58] Field of Search ........................ 525/424; 524/101; 528/492

[56] References Cited

U.S. PATENT DOCUMENTS 3,919,218  11/1975  Schmitt et al. ............... 260/248 NS
4,208,493   6/1980  Deleens et al. ...................... 525/420
4,415,693  11/1983  Chen et al. ........................... 525/424

Primary Examiner—Maurice J. Welsh
Attorney, Agent, or Firm—Millen & White

[57] ABSTRACT

Improved molding compositions based on high-molecular polyether ester amides are obtained by heating at 180°–250° C. a melt containing a mixture of A. a polyether ester amide having a relative solution viscosity $\eta_{rel}$ of at least 1.5; and B. 0.05–1.5 parts by weight, based on 100 parts by weight of the molding composition, of a cyclic, trimerized isophorone diisocyanate or an oligomer thereof having a degree of oligomerization of 2–5 and an isocyanate functionality of 3–7.

10 Claims, No Drawings

MOLDING COMPOSITIONS BASED ON HIGH MOLECULAR WEIGHT POLYETHER ESTER AMIDES

BACKGROUND OF THE INVENTION

The present invention relates to molding compositions based on high-molecular weight polyether ester amides.

Polyether ester amides with relative solution viscosities of less than 1.95 can be prepared and processed in a relatively convenient manner. However, polyether ester amides having higher relative solution viscosities, which are required for a variety of industrial applications, e.g., production of pipes or profiles by extrusion, are difficult and more costly to manufacture.

It is known to produce higher-molecular weight polyether ester amides by solid phase recondensation from polymers of lower molecular weight. However, such a procedure is time-consuming and requires the expenditure of large amounts of energy.

It is also known to produce higher-molecular weight polyether ester amides continuously in thin-film evaporators (U.S. Pat. No. 4,208,493). However, that method is costly both from an industrial and energy viewpoint, and the processability of molding compositions prepared therefrom is not improved.

OBJECTS OF THE INVENTION

It is a principal object of the invention to provide molding compositions based on higher molecular weight ($\eta_{rel} > 2.0$) polyether ester amides, which exhibit good processing properties.

Upon further study of the specification and appended claims, further objects and advantages of this invention will become apparent to those skilled in the art.

SUMMARY OF THE INVENTION

These objects have been attained by molding compositions prepared by heating at 180°–250° C. a molten mixture of (A.) A polyether ester amide having a relative solution viscosity $\eta_{rel}$ of at least 1.5 and less than 2.0; and (B.) 0.05–1.5 parts by weight, based on 100 parts by weight of the molding composition, of a cyclic, trimerized isophorone diisocyanate, or an oligomer thereof having a degree of oligomerization of 2–5 with an isocyanate functionality of 3–7.

DETAILED DESCRIPTION

Cyclic, trimerized isophorone diisocyanates, as well as their oligomers with a degree of oligomerization of 2–5 and a functionality of 3–7 and also methods for their manufacture, useful in practicing the present invention are known from U.S. Pat. No. 3,919,218. By cyclic, trimerized isophorone diisocyanates is meant cyclic trimers of isophorone diisocyanate, and by oligomers thereof is meant low molecular weight polymers of the cyclized trimers having the degree of oligomrization stated above. By isocyanate functionality is meant the number of unreacted or available (for reaction) isocyanate groups per molecule of cyclic, trimerized diisophorone diisocyanate and per each individual oligomer thereof. Mixtures of these diisocyanates can also be used as component (B) when practicing the present invention. Cyclic trimerized isophorone diisocyanate is preferred. The diisocyanates are used in amounts of 0.05–1.5 parts by weight, preferably 0.1–1.3 parts by weight, based on 100 parts by weight of the molding composition.

The polyether ester amides (component A) are obtained by the condensation of 1. one or several polyamide-forming compounds from the group of the ω-aminocarboxylic acids and lactams having at least 6 carbon atoms,
2. a polyalkylene or a corresponding polycycloaliphatic glycol, wherein the chain may be oxygen interrupted, with a molecular weight ranging from 160 to 3,000, and
3. one or several aliphatic, cycloaliphatic, or aromatic dicarboxylic acids.

Preferably laurolactam, ω-aminododecanoic acid, or ω-aminoundecanoic acid are the ω-aminocarboxylic acids or lactams utilized as the polyamide-forming compound. In place of the monomolecular aminocarboxylic acids, their polymers having an average molecular weight of 500–20,000, preferably 4,000–10,000 may be used. Values for the average molecular weights are determined from the viscosity number of the polymer.

Preferred glycols (component A.2) are polyethylene glycol, polypropylene glycol, and polytetrahydrofurandiol having an average molecular weight ranging from 160 to 3,000, preferably from 300–2,200 are more preferably from 500–1,200. The use of polytetrahydrofurandiol with an average molecular weight ($\overline{M}_n$ as determined by end group titration) of 500–2,000 is particularly preferred).

Component (A.3) comprises aliphatic, cycloaliphatic, or aromatic dicarboxylic acids with 4–11 carbon atoms in the carbon skeleton (excluding COOH groups). Examples are adipic acid, pimelic acid, suberic acid, azelaic acid, sebacic acid, dodecanedioic acid, hexahydroterephthalic acid and the phthalic acids. Terephthalic acid and dodecanedioc acid are preferred for this component.

The polyether ester amides are chosen in such a way that the weight ratio of component (A.1) and (A.2+A.3) is in a range from 20:80 up to 50:50. A weight ratio in the range from 25-45:75-55 is preferred. The hydroxy and carboxy groups of (A.2+A.3) are present in about equivalent proportions, i.e., in a ratio of 1:0.95 to 1:1.05.

Preferred polyether ester amides are produced by reacting laurolactam, polytetrahydrofurandiol of an average molecular weight of 500–2,000, and dodecanedioic acid or terephthalic acid. The weight average molecular weight of these products is in a range from 5,000 to 20,000, preferably 8,000 to 15,000.

The manufacture of suitable polyether ester amides is described in U.S. Pat. Nos. 4,207,410, 4,309,518, 4,429,081, 4,349,661 and 4,345,064. It is also possible to use mixtures of those polyether ester amides.

Polyether ester amides suitable for preparing the molding compositions should exhibit a relative solution viscosity $\eta_{rel}$ of at least 1.5 but less than 2.0.

In order to produce the molding compositions of this invention, a mixture of polyether ester amide and compounds according to component (B) is prepared at room temperature. For the thermal treatment in the melt, a continuously or discontinuously operated kneader is employed. In general, the treatment period at a temperature between 180°–250° C. and preferably 190°–240° C. is 1–5 minutes (continuous mode of operation) and 2–20 minutes (discontinuous mode of operation).

Other polymers, such as, for example, polyamides (U.S. Pat. No. 4,218,549) and polyalkylene terephthalates (U.S. Pat. No. 4,309,518) can be incorporated into the molding compositions of this invention. These polymer components are contained in the resultant mixtures in an amount of 1–40 parts by weight, preferably 5–25 parts by weight.

Customary additives and auxiliary agents, such as pigments, processing aids, fillers and reinforcements, hydrolysis, thermal, and UV stabilizers can be incorporated during manufacture as well as into the finished, treated molding compositions. Such compositions are used in a manner known per se.

The molding compositions of this invention exhibit a number of advantages over the corresponding prior-art products. Most important, they are easier to handle during manufacture, and they do not show any tendency toward crosslinking.

The relative solution viscosity $\eta_{rel}$ throughout this application is determined according to DIN [German Industrial Standard] 53 727 in m-cresol at 25° C. (concentration: 0.5 g/dl).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celcius; unless otherwise indicated, all parts and percentages are by weight. Experiments characterized by letters are not in accordance with the invention.

EXAMPLE 1

Under a nitrogen atmosphere, 50 g of polyether ester amide ($\eta_{rel}=1.812$), obtained from 25 parts by weight of laurolactam and 75 parts by weight of terephthalic acid and equivalent amounts of polyoxytetramethylene glycol (molecular weight [$\overline{M}_n$]: 1,000) based on terephthalic acid are mixed in a laboratory kneader at 240° C. for 15 minutes with the quantity of isophorone diisocyanate oligomer, isocyanate functionality of 3.2, indicated in the table. The resultant rise in relative solution viscosity can be seen from Table 1.

TABLE 1

| Experiment | Isophorone Diisocyanate [g] | rel |
|---|---|---|
| 1 | 0.125 | 2.01 |
| 2 | 0.25 | 2.05 |
| 3 | 0.375 | 2.16 |
| 4 | 0.50 | 2.25 |

TABLE 1-continued

| Experiment | Isophorone Diisocyanate [g] | rel |
|---|---|---|
| A | 1.0 | Gelled |

The products are free of bubbles.

EXAMPLE 2

At 22° C., 9,900 g of granulated polyether ester amide obtained from laurolactam, dodecanedioic acid and equivalent amounts of polyoxytetramethylene glycol, molecular weight [$\overline{M}_n$] of 1,000, based on dodecanedioic acid, and 100 g of isophorone diisocyanate oligomer, isocyanate functionality of 3.2, are mixed in a tumbler dryer. The mixture is then extruded in a twin-screw extruder at the stated temperature and dwell period. The results observed are shown in Table 2.

TABLE 2

| Experiment | Laurolactam/ Dodecanedioic Acid [parts by wt.] | Viscosity of Polyether Ester Amide [η rel] | Dwell Period [min] | Temperature [°C.] | Viscosity of Molding Composition [η rel] |
|---|---|---|---|---|---|
| 5 | 25/75 | 1.81 | 2 | 196 | 2.07 |
| 6 | 25/75 | 1.81 | 2 | 218 | 2.06 |
| 7 | 25/75 | 1.81 | 4 | 218 | 2.27 |
| B | 25/75 | 1.81 | 2 | 255 | 1.91 |
| 8 | 40/60 | 1.87 | 2 | 200 | 2.05 |
| 9 | 61/39 | 1.86 | 2 | 220 | 2.11 |
| 10 | 61/39 | 1.86 | 4 | 220 | 2.17 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A molding composition based on a high-molecular weight polyether ester amide having a relative solution viscosity $\eta_{rel}$ of at least 2.0, prepared by heating at 180°–250° C. a molten mixture of
   (A.) a polyether ester amide with a relative solution viscosity $\eta_{rel}$ of at least 1.5 and less than 2.0; and
   (B.) 0.05–1.5 parts by weight, based on 100 parts by weight of the molding composition, of a cyclic, trimerized isophorone diisocyanate or an oligomer thereof having a degree of oligomerization of 2–5 and an isocyanate functionality of 3–7;
for a time effective to increase the $\eta_{rel}$ value of (A.) to at least 2.0.

2. A molding composition according to claim 1, wherein component (B) is cyclic, trimerized isophorone diisocyanate.

3. A molding composition according to claim 1, wherein the mixture contains 0.1–1.3 parts by weight of component (B).

4. A process for preparing a molding composition based on a high-molecular polyether ester amide having a relative solution viscosity $\eta_{rel}$ of at least 2.0, which comprises heating at 180°–250° C., a molten mixture of
   (A.) a polyether ester amide having a relative solution viscosity $\eta_{rel}$ of at least 1.5 and less than 2.0; and (B.) 10.05–1.5 parts by weight, based on 100 parts by weight of the molding composition, of a cyclic, trimerized isophorone diisocyanate or an oligomer thereof having a degree of oligomerization of 2–5 and an isocyanate functionality of 3–7.

5. A molding composition according to claim 1, wherein the mixture of components (A) and (B) is heated at 190°–240° C.

6. A method of increasing the relative solution viscosity $\eta_{rel}$ of a polyether ester amide having an $\eta_{rel}$ value comprising heating the starting polyether ester amide at 180°–250° C., for a time effective to increase said $\eta_{rel}$, in molten admixture with 0.05–1.5 parts of weight, based on 100 parts by weight of this admixture, of a cyclic, trimerized isophorone diisocyanate or an oligomer thereof having a degree of oligomerization of 2–5 and an isocyanate functionality of 3–7.

7. A method of claim 1, wherein the starting polyether ester amide has an $\eta_{rel}$ value of at least 1.5 and less than 2.0 and the time of heating is effective to increase $\eta_{rel}$ to a value of at least 2.0.

8. A composition comprising a polyether ester amide with a relative solution viscosity $\eta_{rel}$ of at least 1.5 and less than 2.0; and 0.05–1.5 parts by weight, based on 100 parts by weight of the molding composition, of a cyclic, trimerized isophorone diisocyanate or an oligomer thereof having a degree of oligomerization of 2–5 and an isocyanate functionality of 3–7.

9. A composition suitable for molding comprising an admixture of
   (A.) a polyether ester amide with a relative solution viscosity $\eta_{rel}$ of at least 1.5 and less than 2.0; and
   (B.) 0.05–1.5 parts by weight, based on 100 parts by weight of the molding composition, of a cyclic, trimerized isophorone diisocyanate or an oligomer thereof having a degree of oligomerization of 2–5 and an isocyanate functionality of 3–7,
said admixture having been heated at 180°–250° C. in the molten state for a period of time effective to increase the $\eta_{rel}$ value of (A.) to at least 2.0.

10. A composition of claim 1, wherein the polyether ester amide is prepared from laurolactam, polytetrahydrofurandiol and dodecanoic acid or terephthalic acid and has a molecular weight of 5000 to 20000.

* * * * *